US008110232B2

(12) United States Patent
Clarke

(10) Patent No.: US 8,110,232 B2
(45) Date of Patent: Feb. 7, 2012

(54) PACKAGING OF BANANAS

(75) Inventor: Raymond Clarke, Los Altos, CA (US)

(73) Assignee: Apio, Inc.

(*) Notice: Subject to any disclaimer, the term of this patent is extended or adjusted under 35 U.S.C. 154(b) by 1901 days.

(21) Appl. No.: 09/858,190

(22) Filed: May 15, 2001

(65) Prior Publication Data
US 2002/0090425 A1 Jul. 11, 2002

(51) Int. Cl.
A23B 7/148 (2006.01)
(52) U.S. Cl. ......... 426/106; 426/118; 426/112; 426/418
(58) Field of Classification Search .............. 426/415, 426/419, 112, 118, 124, 106, 316, 270, 418, 426/392; 428/35.2, 34.7, 137, 315.9, 447, 428/500, 35.4
See application file for complete search history.

(56) References Cited

U.S. PATENT DOCUMENTS

| 2,278,571 A | 4/1942 | Skinner |
| 2,611,709 A | 9/1952 | Plagge et al. |
| 3,102,777 A | 9/1963 | Bedrosian et al. ................. 21/58 |
| 3,360,380 A | 12/1967 | Bedrosian |
| 3,423,212 A | 1/1969 | Purcell et al. |
| 3,450,543 A | 6/1969 | Badran et al. |
| 3,450,544 A | 6/1969 | Badran et al. |
| 3,459,116 A | 8/1969 | McDonnell |
| 3,507,667 A | 4/1970 | Magnen |
| 3,574,642 A | 4/1971 | Weinke |
| 3,620,765 A | 11/1971 | McDonnell et al. |
| 3,625,876 A | 12/1971 | Fitko ............................ 260/23.7 |
| 3,630,759 A | 12/1971 | Rumberger |
| 3,681,092 A | 8/1972 | Titchenal et al. |
| 3,683,788 A | 8/1972 | McDonnell et al. |
| 3,706,410 A | 12/1972 | Baker .......................... 229/16 R |
| 3,795,749 A | 3/1974 | Cummin et al. ............... 426/316 |
| 3,798,333 A | 3/1974 | Cummin ....................... 426/106 |
| 3,804,961 A | 4/1974 | Cummin et al. ............... 426/415 |
| 3,844,865 A | 10/1974 | Elton et al. .................... 156/229 |
| 3,903,234 A | 9/1975 | Ikeda et al. ................. 264/210 R |
| 3,932,692 A | 1/1976 | Hirata et al. ................... 428/474 |
| 3,951,610 A | 4/1976 | Freebairn et al. ............... 23/281 |
| 3,975,455 A | 8/1976 | Falender et al. ............... 260/827 |
| 4,049,837 A | 9/1977 | Freebairn ....................... 426/308 |
| 4,055,672 A | 10/1977 | Hirsch et al. .................. 426/127 |
| 4,153,659 A | 5/1979 | Recktenwald ................. 264/83 |
| 4,176,148 A | 11/1979 | Magder et al. ................. 264/41 |
| 4,209,538 A | 6/1980 | Woodruff ...................... 426/314 |
| 4,219,965 A | 9/1980 | Freebairn et al. ................ 47/2 |
| 4,224,347 A | 9/1980 | Woodruff ...................... 426/106 |
| 4,256,770 A | 3/1981 | Rainey ......................... 426/124 |
| 4,322,465 A | 3/1982 | Webster ....................... 428/194 |
| 4,347,844 A | 9/1982 | Ohki et al. .................... 128/287 |
| 4,350,655 A | 9/1982 | Hoge ........................... 264/145 |
| 4,386,129 A | 5/1983 | Jacoby ......................... 428/215 |
| 4,394,930 A | 7/1983 | Korpman ...................... 220/444 |
| 4,400,291 A | 8/1983 | Freebairn et al. ...... 252/188.3 R |
| 4,423,080 A | 12/1983 | Bedrosian et al. ............ 426/124 |
| 4,461,420 A | 7/1984 | Horvath ......................... 229/43 |
| 4,472,328 A | 9/1984 | Sugimoto et al. ............... 264/41 |
| 4,485,133 A | 11/1984 | Ohtsuka et al. ................. 428/35 |
| 4,487,791 A | 12/1984 | Komatsu et al. ................ 428/35 |
| 4,513,015 A | 4/1985 | Clough ......................... 426/396 |
| 4,515,266 A | 5/1985 | Myers .......................... 206/205 |
| 4,528,235 A | 7/1985 | Sacks et al. ................... 428/220 |
| 4,536,409 A | 8/1985 | Farrell et al. .................. 426/398 |
| 4,576,014 A | 3/1986 | Miller et al. .................... 62/268 |
| 4,613,544 A | 9/1986 | Burleigh .................... 428/315.5 |
| 4,657,610 A | 4/1987 | Komatsu et al. ................ 156/87 |
| 4,698,372 A | 10/1987 | Moss ............................. 21/145 |
| 4,704,238 A | 11/1987 | Okuyama et al. ............... 264/41 |
| 4,705,812 A | 11/1987 | Ito et al. ......................... 521/92 |
| 4,705,813 A | 11/1987 | Ito et al. ......................... 521/92 |
| 4,759,444 A | 7/1988 | Barmore .................... 206/521.1 |
| 4,759,935 A | 7/1988 | Toshitsugu .................... 426/110 |
| 4,769,262 A | 9/1988 | Ferrar et al. .................... 428/35 |
| 4,821,489 A | 4/1989 | MacLeod et al. ............... 53/419 |
| 4,833,172 A | 5/1989 | Schwarz et al. ................. 521/62 |
| 4,840,823 A | 6/1989 | Chigami et al. ............. 428/35.5 |
| 4,847,145 A | 7/1989 | Matsui ......................... 428/323 |
| 4,856,650 A | 8/1989 | Inoue ........................... 206/204 |
| 4,861,644 A | 8/1989 | Young et al. .................. 428/195 |
| 4,863,788 A | 9/1989 | Bellairs et al. ................ 428/246 |
| 4,876,146 A | 10/1989 | Isaka et al. ................... 428/347 |
| 4,877,679 A | 10/1989 | Leatherman et al. ......... 428/224 |
| 4,879,078 A | 11/1989 | Antoon .......................... 264/41 |

(Continued)

FOREIGN PATENT DOCUMENTS

| EP | 0311423 | | 12/1989 |
| EP | 752378 | * | 1/1997 |
| JP | 63-087941 | * | 4/1988 |
| JP | 02-157232 | * | 6/1990 |
| JP | 08-103212 | * | 4/1996 |
| WO | WO 95/00030 | | 1/1995 |

OTHER PUBLICATIONS

Foods & Food Ingred J. (Jpn) 1998, #176, p. 66-75 (Dialog 03530656 Item 1, File 94).*
Veeraju et al (Modern Packaging, 1966, 40,#2).*
Rizvi (Proceedings of the Intl. Confer. On Controlled Atm. Packag., Oct. 29, 1984).*
Varriano-Marston et al (Produce Marketing Almanac, 1987).*
Irving (CSIRO, 1984).*
Marcellin (Revue Generale du Froid, Mar. 1974).*
Saguy (Refrigeration Science and Technolgy,1973, p. 149 plus).*
Urushizaki (Foods and Food Ingredients,Japan 1998).*
Zagory et al (Food Technology, Sep. 1988, p. 70 plus).*
Mannapperuma (Proc. Atm. Res. Conf.,1989, p. 225 plus).*
Leonard (Annals of Botany,1947, vol. 11, No. 43).*

(Continued)

Primary Examiner — Drew E Becker
Assistant Examiner — Preston Smith

(57) ABSTRACT

Packaging of bananas in containers having designed permeabilities to oxygen, carbon dioxide, and ethylene. The containers preferably include a gas-permeable membrane comprising (1) a microporous film, and (2) a polymeric coating on the microporous film. The containers enable storage and/or ripening of bananas under controlled conditions. Using the new containers, bananas can be ripened while they are being transported, or in conventional ripening rooms without opening the bags in which they have been transported. In addition, bananas can be preserved in a satisfactory ripened state for longer periods of time.

12 Claims, No Drawings

U.S. PATENT DOCUMENTS

| | | | |
|---|---|---|---|
| 4,883,674 A | 11/1989 | Fan | 426/118 |
| 4,885,086 A | 12/1989 | Miura | 210/321.8 |
| 4,886,372 A | 12/1989 | Greengrass et al. | 383/100 |
| 4,892,779 A | 1/1990 | Leatherman et al. | 428/220 |
| 4,923,650 A | 5/1990 | Antoon et al. | 264/41 |
| 4,923,703 A | 5/1990 | Antoon | 426/118 |
| 4,937,115 A | 6/1990 | Leatherman | 428/36.4 |
| 4,939,030 A | 7/1990 | Tsuji et al. | 428/315 |
| 4,943,440 A | 7/1990 | Armstrong | 426/118 |
| 4,956,209 A | 9/1990 | Isaka et al. | 428/35.2 |
| 4,960,639 A | 10/1990 | Oda et al. | 428/34.5 |
| 4,962,777 A | 10/1990 | Bell | 134/63 |
| 4,973,625 A | 11/1990 | Deyrup | 525/74 |
| 4,996,071 A | 2/1991 | Bell | 426/415 |
| 5,006,342 A | 4/1991 | Cleary et al. | 424/445 |
| 5,008,296 A | 4/1991 | Antoon et al. | 521/91 |
| 5,011,698 A | 4/1991 | Antoon et al. | 426/395 |
| 5,026,591 A | 6/1991 | Henn et al. | 428/198 |
| 5,032,450 A | 7/1991 | Rechlicz et al. | 428/196 |
| 5,035,933 A | 7/1991 | Ilenda et al. | 428/36.6 |
| 5,039,565 A | 8/1991 | Deyrup | 428/35.7 |
| 5,066,683 A | 11/1991 | Dillon et al. | 521/54 |
| 5,110,677 A | 5/1992 | Barmore et al. | 428/349 |
| 5,126,197 A | 6/1992 | Schinkel et al. | 428/349 |
| 5,153,039 A | 10/1992 | Porter et al. | 428/36.92 |
| 5,164,258 A | 11/1992 | Shida et al. | 428/319.3 |
| 5,165,947 A | 11/1992 | Colucci et al. | 426/124 |
| 5,176,953 A | 1/1993 | Jacoby et al. | 428/315.5 |
| 5,196,262 A | 3/1993 | Schwarz et al. | 428/315.5 |
| 5,221,571 A | 6/1993 | Cammiss et al. | 428/220 |
| 5,254,074 A | 10/1993 | Landers et al. | 493/213 |
| 5,254,401 A | 10/1993 | Kelch et al. | 428/317.1 |
| 5,256,473 A | 10/1993 | Kotani et al. | 428/218 |
| 5,260,360 A | 11/1993 | Mrozinski et al. | 524/95 |
| 5,271,976 A | 12/1993 | Kondo et al. | 428/35.2 |
| 5,275,854 A | 1/1994 | Maier et al. | 428/36.5 |
| 5,279,843 A | 1/1994 | Zomorodi | 426/324 |
| 5,300,570 A | 4/1994 | Ilenda et al. | 525/80 |
| 5,316,778 A | 5/1994 | Hougham | 426/324 |
| 5,317,143 A | 5/1994 | Jacoby et al. | 521/143 |
| 5,322,726 A | 6/1994 | Dew | 428/216 |
| 5,332,617 A | 7/1994 | Mills et al. | 428/215 |
| 5,339,602 A | 8/1994 | Landers et al. | 53/410 |
| 5,348,752 A | 9/1994 | Gorlich | 426/129 |
| 5,352,513 A | 10/1994 | Mrozinski et al. | 428/315.5 |
| 5,362,531 A | 11/1994 | Samuel et al. | 428/36.6 |
| 5,411,351 A | 5/1995 | Lasch et al. | 404/14 |
| 5,427,807 A | 6/1995 | Chum et al. | 426/393 |
| 5,429,833 A | 7/1995 | Wyslotsky | 426/122 |
| 5,443,851 A | 8/1995 | Christie et al. | 426/88 |
| 5,458,899 A | 10/1995 | Floyd et al. | 426/404 |
| 5,460,841 A | 10/1995 | Herdman | 426/263 |
| 5,516,539 A | 5/1996 | Walsh et al. | 426/231 |
| 5,532,053 A | 7/1996 | Mueller | 428/287 |
| 5,560,947 A | 10/1996 | Bell | 426/106 |
| 5,565,230 A | 10/1996 | Bailey | 426/411 |
| 5,575,418 A | 11/1996 | Wu et al. | 229/3.5 R |
| 5,658,607 A | 8/1997 | Herdman | 426/263 |
| 5,667,827 A | 9/1997 | Breen et al. | 426/129 |
| 5,688,509 A | 11/1997 | Radwan et al. | 424/195.1 |
| 5,711,978 A | 1/1998 | Breen et al. | 426/129 |
| 5,730,311 A | 3/1998 | Curtis | 220/371 |
| 5,747,082 A | 5/1998 | Floyd et al. | 426/109 |
| 5,759,650 A | 6/1998 | Raines et al. | 428/35.7 |
| 5,799,495 A | 9/1998 | Gast et al. | 62/78 |
| 5,811,142 A | 9/1998 | DelDuca et al. | 426/424 |
| 5,820,955 A | 10/1998 | Brander | 428/35.7 |
| 5,832,699 A | 11/1998 | Zobel | 53/461 |
| 5,840,235 A | 11/1998 | Yagi et al. | 264/288.8 |
| 5,849,127 A | 12/1998 | Kuo | 156/244.11 |
| 5,865,335 A | 2/1999 | Farrell et al. | 220/270 |
| 5,866,172 A | 2/1999 | Parks | 425/72.1 |
| 5,866,184 A | 2/1999 | Gorlich et al. | 426/396 |
| 5,866,649 A | 2/1999 | Hong et al. | 524/538 |
| 5,908,649 A | 6/1999 | Floyd et al. | 426/109 |
| 5,916,614 A | 6/1999 | Gorlich | 426/129 |
| 5,932,497 A | 8/1999 | Morman et al. | 442/286 |
| 5,935,681 A | 8/1999 | Paulett | 428/137 |
| 5,954,067 A | 9/1999 | Brown et al. | 134/25.3 |
| 5,958,319 A | 9/1999 | Brant | 264/177.19 |
| 6,050,412 A | 4/2000 | Clough et al. | 206/423 |
| 6,060,136 A | 5/2000 | Patrick et al. | 428/35.2 |
| 6,063,505 A | 5/2000 | Kuratsuji et al. | 428/516 |
| 6,085,930 A | 7/2000 | Curtis | 220/371 |
| 6,152,295 A | 11/2000 | Brander et al. | 206/204 |
| 6,189,299 B1 | 2/2001 | Brown et al. | 53/512 |
| 6,210,724 B1 | 4/2001 | Clarke et al. | 426/118 |
| 6,248,380 B1 | 6/2001 | Kocher et al. | 426/127 |
| 6,376,032 B1 * | 4/2002 | Clarke et al. | 428/34.7 |
| 6,548,132 B1 * | 4/2003 | Clarke et al. | 428/34.7 |

OTHER PUBLICATIONS

Ballantyne et al (Intl. J. of Food Science and Technology (1988).*

Hardenburg (HortScience (1971).*

Emond et al (American Society of Agricultural Engineers, Jan./Feb. 1991, p. 239 plus).*

Clarke et al., "Temperature Switchable Membranes for Creating and Maintaining Beneficial Package Atmospheres for Fresh Produce", Plastic Film and Sheeting, 17, pp. 22-34 (Jan. 2001).

Clarke, "Temperature Switchable Membranes for Packaging Fresh Produce", 2000 TAPPI Polymers, Laminations & Coatings Conference, Nov. 2000, pp. 1257-1271.

Clarke, "Temperature Switchable Membranes for Packaging Fresh Produce", Paper, Film & Foil Converter, Nov. 1, 2000.

Clarke, "Temperature Switchable Membranes for Creating and Maintaining Beneficial Package Atmospheres for Fresh Produce", 1999 Polymers, Laminations & Coatings Conference, pp. 663-669, Aug. 1999.

Clarke et al, "The Future in Film Technology: a Tunable Packaging System for Fresh Produce", $7^{th}$ Int. Controlled Atm.Res. Conf CA97 Proc. 5, 68-75 (Oct. 1997).

Mannapperuma et al, "Design of Polymeric Packages for Modified Atmosphere Storage of Fresh Produce", Proc. $5^{th}$ Int'l Res. Conf, vol. 2, pp. 225-233.

Liu,, "The Ethylene Problem in Apple Storage", Michigan State University, Hort. Rep 28, pp. 86-96 (1977).

Kader, "Relative Tolerance of Fruits and Vegetables to Elevated $CO_2$ and reduced $O_2$ Levels", Michigan State University, Hort. Rep 28, pp. 260-264 (1977).

Marriott, "Bananas—Physiology and Biochemistry of Storage and Ripening for Optimum Quality", CRC Critical Reviews in Food Science & Nutrition, pp. 41-54 (1980).

Liu, "Storage of Bananas in Polyethylene Bags with an Ethylene Absorbent", HortScience, 5 (1), pp. 25-27 (Feb. 1970).

Biale, J.B. Respiration of Fruits Encyclopedia of Plant Physiology (1960) Berlin: Springer-Verlag; Ed. W. Ruhland, vol. XII, Pt. 2, pp. 536 and 566-571.

Brady, C.J.; O'Connell, P.B.H.; Smydzuk, J.; Wade, N.L. Permeability, Sugar Accumulation, and Respiration Rate in Ripening Banana Fruits Aust. J. Biol. Sci., (1970) 23, pp. 1143-1152.

Broughton, W.J.; Wu, K.F. Storage Conditions and Ripening of Two Cultivars of Banana Scientia Hort. (Amsterdam) (1979) vol. 10, Issue 1: pp. 83-93.

Brown, D.J. The Effects of Low Oxygen Atmospheres on Ethylene and Carbon Dioxide Production by and 1-Amino-cyclopropane-1-Carboxylic Acid Concentration in Banana Fruits MS Thesis (1981), University of Maryland, College Park.

Elyatem, S.M.; Banks N.H.; Cameron, A.C. Oxygen Concentration Effects on Ethylene Production by Ripening Banana Tissue Postharvest Biology and Technology 4 (1994), pp. 343-351.

Fuchs, Y.; Gorodeiski, N.T. The Course of Ripening of Banana Fruits Stored in Sealed Polyethylene Bags J. Amer. Soc. Hort. Sci., (1971) 96(4): pp. 401-403.

Gowen, S. Bananas and Plantains Chapman & Hall (1995) pp. 424-425.

Hesselman, C.W.; Freebairn, H.T. Rate of Ripening of Initiated Bananas as Influenced by Oxygen and Ethylene J. Amer. Soc. Hort. Sci., (1969) 94(6): pp. 635-637.

Hewage, S.K.; Wainwright, H.; Wijerathnam S.W.; Swinburne, T. The Modified Atmosphere Storage of Bananas as Affected by Different Temperatures Postharvest Phys., Pathology and Technol. for Hort. Commodities: Recent Advances (1995) pp. 172-176.

Kanellis, A.; Solomos, T. The Effect of Low Oxygen on the Activities of Pectinmethylesterase and Acid Phosphatase During the Course of Ripening of Bananas 4th Natl. Controlled Atmosph. Res. Conf.; Raleigh, NC (1985) SM Blankenship: pp. 20-26.

Leonard, E.R. Studies in Tropical Fruits. XVII. The Respiration of Bananas in Different Concentrations of Oxygen at 53F, and During Subsequent Ripening in Air at 68F. Annals of Botany (Jul. 1947) N.S. vol. XI, No. 43: pp. 299-331.

Liu, F.W. Storing Ethylene-Pretreated Bananas in Controlled Atmosphere and Hypobaric Air J. Amer. Soc. Hort. Sci. (1976) 101(3):pp. 198-201.

F.W. Ethylene Inhibition of Senescent Spots on Ripe Bananas J. Amer. Soc. Hort. Sci. (1976) vol. 101(6): pp. 684-686.

Liu, F.W. Ripening Bananas with Ethephon in Three Polymeric Film Packages HortScience, (1978) 13(6) pp. 688-690.

Liu, F.W. Synergistic Effects of High Temperature and Low Concentration Ethylene on Ripening of "Dwarf Cavendish" Bananas HortScience (1978) 13(6): pp. 690-692.

Lowings, P.H.; Cutts, D.F. The Preservation of Fresh Fruits and Vegetables Proceedings—Inst. Food Science & Tech. of the UK (Jun. 1982) vol. 15(2): pp. 52-54.

Mapson, L.W. Biosynthesis of Ethylene and Its Control in: Conf Trop Subtrop Fruits; Food Research Institute, Norwich, England: (1969), pp. 85-92.

Mapson, L.W. Biosynthesis of Ethylene and the Ripening of Fruit Endeavour (1970) vol. 29(106): pp. 29-33.

Mapson, L.W.; Robinson, J.E. Relation Between Oxygen, Tension, Biosynthesis of Ethylene, Respiration and Ripening Changes in Banana Fruit J. Food Technol. (1966) vol. 1, pp. 215-225.

Marriott, J. Bananas—Physiology and Biochemistry of Storage and Ripening for Optimum Quality CRC Critical Reviews in Food Science and Nutrition (1980) 13(1): pp. 41-42.

McGlasson, W.B.; Wills, R.B.H. Effects of Oxygen and Carbon Dioxide on Respiration, Storage Life, and Organic Acids of Green Bananas Aust. J. Biol. Sci. (1972) 25(1): pp. 35-42.

Parsons, C.S.; Gates, J.E.; Spalding, D.H. Quality of Some Fruits and Vegetables after Holding in Nitrogen Atmospheres Amer. Soc. for Hort. Sci. (1964) vol. 84: pp. 549-566.

Peacock, B.C. Banana Ripening-Effect of Temperature of Fruit Quality Queensland Journal of Agricultural and Animal Sciences (1980) vol. 37(1): pp. 39-45.

Quazi, M.H.; Freebairn, H.T. The Influence of Ethylene, Oxygen, and Carbon Dioxide on the Ripening of Bananas Botanical Gazette, (1970) 131(1):pp. 5-14.

Rippon, L.E.; Trochoulias, T. Ripening Responses of Bananas to Temperature Aust. J. of Exper. Ag. and Animal Husbandry (1976) vol. 16, Part 78: pp. 140-144.

Scott, K.J.; McGlasson, W.B.; Roberts, E.A. Potassium Permanganate as an Ethylene Absorbent in Polyethylene Bags to Delay Ripening of Bananas During Storage J. of Exper. Ag. and Animal Husbandry (1970) vol. 10: pp. 237-240.

Scriven, F.M.; Gek, C.O.; Wills, B.H. Sensory Differences between Bananas Ripened Without and With Ethylene HortScience (1989) 24(6): pp. 983-984.

Smock, R.M. Controlled Atmosphere Storage of Fruits Horticultural Reviews, 1979, vol. 1, pp. 301-336.

Smock, R.M. Methods of Storing Bananas Philippine Agriculturist (1967) vol. 51: pp. 501-517.

Wade, N.L. Effects of Oxygen Concentration and Ethepon Upon the Respiration and Ripening of Banana Fruits J. of Experimental Botany, (1974) vol. 25(88): pp. 955-964.

Wardlaw, C.W. Preliminary Observations on the Refrigerated Gas Storage of Gros Michel Bananas Tropical Agriculture (Trinidad), (1940) vol. XVII, No. 6: pp. 103-105.

Woodruff, R.E. Modified Atmosphere Storage of Bananas Proc. Natl. CA Res. Conf., Michigan State Univ. (1969b) Hort Rpt. 9:pp. 80-94.

Young, R.E.; Romani, R.J.; Biale, J.B. Carbon Dioxide Effects on Fruit Respiration. II. Response of Avocados, Bananas, & Lemons Plant Physiol., (1962) vol. 37: pp. 416-422.

* cited by examiner

PACKAGING OF BANANAS

CROSS-REFERENCE TO RELATED APPLICATIONS

This application claims priority under 37 CFR 1.78 (a)(5) from my copending provisional application Ser. No. 09/580,379, which was filed May 26, 2000, under 37 CFR 1.53 (b) and which has been converted to a provisional application under 37 CFR 1.53 (c) (2).

BACKGROUND OF THE INVENTION

This invention relates to the packaging of bananas.

Respiring biological materials consume oxygen (O2) and produce carbon dioxide ($CO_2$) at rates which depend upon temperature and the stage of their development. Ideally, a respiring material should be stored in a container whose permeability to $O_2$ and $CO_2$ is correlated with (i) the atmosphere outside the package, (ii) the rates at which the material consumes $O_2$ and produces $CO_2$, and (iii) the temperature, to produce the desired atmosphere within the container. This is the principle behind the technology of controlled atmosphere packaging (CAP) and modified atmosphere packaging (MAP), as discussed, for example, in U.S. Pat. No. 3,450,542, (Badran), Pat. No. 3,450,544 (Badran et al.), Pat. No. 3,798,333 (Cummin et al. Pat. No. 4,734,324 (Hill), Pat. No. 4,830,863 (Jones), Pat. No. 4,842,875 (Anderson), Pat. No. 4,879,078, (Antoon) Pat. No. 4,910,032, (Antoon) Pat. No. 4,923,703, (Antoon), 5,045,331, (Antoon), Pat. No. 5,160,768 (Antoon), Pat. No. 5,254,354 (Stewart) and Pat. No. 6,013,293 (De Moor), copending commonly assigned U.S. patent application Ser. Nos. 08/759,602 (Clarke et al.) and 09/121,082 (Clarke et al.), International Publication Numbers WO 94/12040 (Fresh Western), WO 96/38495 (Landec) and WO 00/04787 (Landec), and European Patent Applications Nos. 0,351,115 and 0,351,116 (Courtaulds). The disclosure of each of these patents, applications and publications is incorporated herein by reference.

Bananas are respiring biological materials whose storage and ripening present the most serious problems because
(i) bananas are grown in locations far distant from the locations at which they are consumed;
(ii) they are damaged by storage at temperatures below about 14.4° C., with the extent of the damage depending upon the time spent below that temperature and how far the temperature is below 14.4° C. (58° F.);
(iii) they go through a climacteric when they ripen, thus producing a very large increase in respiration rate and the generation of heat;
(iv) they generate ethylene as they ripen, and they ripen at a rate which increases with the concentration of ethylene around them—as a result, a single prematurely ripe banana can trigger premature ripening of many others; and
(iv) once they have ripened, and have been exposed to air, they rapidly become over-ripe.

These problems have not yet been solved. The conventional procedure is to harvest the bananas when they are hard, green and unripe; to transport the green bananas, at 13-14° C., to the location where they will be consumed; to ripen the green bananas by exposing them to ethylene in a ripening room at that location; and to place the ripened bananas on sale. The time at which the bananas are harvested depends on the time needed to transport them to the point-of-sale. Thus bananas are typically harvested at week 11 (i.e. 11 weeks after the flower emerges from the plant) or week 12. The green bananas are shipped in bags made of polyethylene about 0.04 to 0.06 mm (1.5-2.5 mil) thick, with each bag containing about 18 kg (40 lb) of bananas and being supported by a cardboard box. In many cases, after the bananas have been placed in the bag, most of the air is exhausted from the bag, and the bag is then sealed; this is the procedure generally described in U.S. Pat. No. 3,450,542 (Badran). In other cases, the bag contains vent holes.

A serious disadvantage of the conventional procedure is the need to harvest the bananas a good while before they are fully grown. It would be desirable to harvest the bananas at a later time, when they are larger. However, the later the bananas are picked, the greater the propensity for their climacteric to be triggered by small concentrations of ethylene, and experience has shown that if the bananas are harvested later than the presently established timetables, this results in prematurely ripe bananas when the bananas are shipped in vented bags, and in so-called "green-ripe" bananas when the bananas are shipped in sealed bags. Green-ripe bananas soften, but remain green, and have an unpleasant flavor.

Another serious disadvantage of the conventional procedure is that, in order to ripen the green bananas by exposing them to ethylene, it is necessary to open each of the shipping bags if, as in most cases, the bags have been sealed during shipping.

Another serious disadvantage of the conventional procedure is that the bananas, once ripened, must be sold within a few days, or scrapped.

Another serious disadvantage of the conventional procedure is that the heat generated by the ripening of the bananas is generated over a relatively short period of time, which heats the bananas to an extent that causes dehydration of the bananas and/or increases the demand on the refrigeration equipment used to keep the bananas cool.

SUMMARY OF THE INVENTION

The present invention mitigates or overcomes one or more of these disadvantages by packaging bananas in a bag (or other container) having designed permeabilities to oxygen ($O_2$) and carbon dioxide ($CO_2$), and in many aspects of the invention, also to ethylene. Some embodiments of the invention make it possible to maintain bananas, before and/or after their climacteric in a packaging atmosphere which enables storage and/or ripening of green bananas in a controlled fashion. Other embodiment of the invention make it possible to store bananas, after their climacteric, within a desired range of color stages (e.g. within the range most attractive for retail sale) for a longer period than is possible under conventional practice.

The containers used in the present invention preferably, but not necessarily, include at least one atmosphere control member which provides a pathway for $O_2$ and $CO_2$, and which comprises a gas-permeable membrane comprising
(1) a microporous film, and
(2) a polymeric coating on the microporous film.

The atmosphere control member is preferably a control member as described in one or more of copending, commonly assigned U.S. patent application Ser. Nos. 08/759,602 and 09/121,082 and U.S. Pat. No. 6,013,293 incorporated by reference herein. Different aspects of the invention make it possible to ripen bananas in a sealed container, for example in a conventional ripening room or while the bananas are being transported; and/or to harvest bananas at a later time than is now possible; and/or to preserve bananas in a satisfactory ripened state for longer than is now possible.

In a first aspect, this invention provides a container which is suitable for packaging bananas and which has at least one, and preferably both, of the following characteristics
(1) the container can be sealed around a quantity of bananas, said quantity being at least 4 kg, preferably at least 15 kg, especially 16 to 22 kg, and, when sealed around the bananas, has an $O_2$ permeability at 13° C., per kg of bananas in the container (OP13/kg), of at least 700, preferably at least 1000, particularly at least 1500, ml/atm.24 hrs and an R ratio at 13° C. of at least 2, preferably at least 3, and preferably has an ethylene permeability at 13° C., per kg of bananas in the container (EtOP13/kg) which is at least 3 times, preferably at least 4 times, the OP13/kg of the container; and
(2) the container includes at least one permeable control member which (i) provides a pathway for $O_2$, $CO_2$ and ethylene to enter or leave the packaging atmosphere and (ii) comprises a gas-permeable membrane comprising
  (a) a microporous polymeric film, and
  (b) a polymeric coating on the microporous film.

In a second aspect, this invention provides a package which comprises
(a) a sealed container, and
(b) within the sealed container, bananas and a packaging atmosphere around the bananas;
the sealed container having an $O_2$ permeability at 13° C., per kg of bananas in the container (OP13/kg), of at least 700, preferably at least 1000, particularly at least 1500, ml/atm.24 hrs and an R ratio at 13° C. of at least 2, preferably at least 3.

In a third aspect, this invention provides a method of ripening green bananas which comprises
(A) providing a sealed package which comprises
  (a) a sealed container, and
  (b) within the sealed container, green bananas and a packaging atmosphere around the green bananas;
the sealed container having an $O_2$ permeability at 13° C., per kg of bananas in the container (OP13/kg), of at least 700, preferably at least 1000, particularly at least 1500, ml/atm.24 hrs, an R ratio at 13° C. of at least 2, preferably at least 3, and an ethylene permeability at 13° C., per kg of bananas in the container (EtOP13/kg) which is at least 3 times, preferably at least 4 times, the OP13/kg of the container; and
(B) placing the sealed package in an atmosphere containing ethylene.

In a fourth aspect, this invention provides a method of ripening green bananas which comprises
(A) placing, in a sealable container,
  (a) the green bananas, and
  (b) a source of ethylene;
(B) sealing the container around the green bananas and the source of ethylene, thus providing a sealed package which comprises
  (a) a sealed container, and
  (b) within the sealed container, the green bananas, the source of ethylene, and a packaging atmosphere around the green bananas;
the sealed container having an $O_2$ permeability at 13° C., per kg of bananas in the container (OP13/kg), of at least 700, preferably at least 1000, particularly at least 1500, ml/atm.24 hrs, an R ratio at 13° C. of at least 2, preferably at least 3, and an ethylene permeability at 13° C., per kg of bananas in the container (EtOP13/kg) which is at least 3 times, preferably at least 4 times, the OP13/kg of the container; and
(C) exposing the bananas in the sealed package to ethylene from the source of ethylene in the sealed container.

In a fifth aspect, this invention provides a method of storing green bananas which comprises
(A) placing the green bananas in a container which comprises an atmosphere control member which comprises
  (1) a microporous film, and
  (2) a polymeric coating on the microporous film;
(B) sealing the container, thus providing a sealed package which comprises
  (a) a sealed container, and
  (a) within the sealed container, the green bananas, and a packaging atmosphere around the green bananas; and
(C) maintaining the sealed bag at the temperature of 13-18° C.

In a sixth aspect, this invention provides a package which is stored in air and which comprises
(a) a sealed container, and
(b) within the sealed container, 1 to 2.5 kg (2 to 5 lb) of bananas which have passed their climacteric and which are at a color stage less than 5, and a packaging atmosphere around the bananas;
the sealed container including at least one permeable control member which provides a pathway for $O_2$ and $CO_2$ to enter or leave the packaging atmosphere and which comprises a gas-permeable membrane comprising
  (1) a microporous film, and
  (2) a polymeric coating on the microporous film; and
the packaging atmosphere containing at least 0.8%, preferably 1.5 to 6%, especially 1.5 to 3%, of $O_2$, and less than 15%, preferably less than 7%, of $CO_2$, with the total quantity of $O_2$ and $CO_2$ being less than 16%, preferably less than 10%.

In a seventh aspect, this invention provides a package which comprises
(a) a sealed container, and
(b) within the sealed container, bananas and a packaging atmosphere around the bananas;
the sealed container including at least one permeable control member which provides a pathway for $O_2$, $CO_2$ and ethylene to enter or leave the packaging atmosphere and which comprises a gas-permeable membrane comprising
  (a) a microporous polymeric film, and
  (b) a polymeric coating on the microporous film.

In an eighth aspect, this invention provides a method of ripening green bananas which comprises
(A) providing a sealed package which comprises
  (a) a sealed container, and
  (b) within the sealed container, green bananas and a packaging atmosphere around the green bananas;
the sealed container including at least one permeable control member which provides a pathway for $O_2$, $CO_2$ and ethylene to enter or leave the packaging atmosphere and which comprises a gas-permeable membrane comprising
  (a) a microporous polymeric film, and
  (b) a polymeric coating on the microporous film; and
(B) placing the sealed package in an atmosphere containing ethylene.

In a ninth aspect, this invention provides a method of ripening green bananas which comprises
(A) placing, in a sealable container,
  (a) the green bananas, and
  (b) a source of ethylene;
(B) sealing the container around the green bananas and the source of ethylene, thus providing a sealed package which comprises
  (a) a sealed container, and
  (b) within the sealed container, the green bananas, the source of ethylene, and a packaging atmosphere around the green bananas;

the sealed container including at least one permeable control member which provides a pathway for $O_2$, $CO_2$ and ethylene to enter or leave the packaging atmosphere and which comprises a gas-permeable membrane comprising
  (a) a microporous polymeric film, and
  (b) a polymeric coating on the microporous film; and
(C) exposing the bananas in the sealed package to ethylene from the source of ethylene in the sealed container.

In a tenth aspect, this invention provides a method of storing green bananas which comprises
  (A) placing the green bananas in a container which comprises an atmosphere control member which comprises
    (1) a microporous film, and
    (2) a polymeric coating on the microporous film;
  (B) sealing the container, thus providing a sealed package which comprises
    (a) a sealed container, and
    (b) within the sealed container, the green bananas, and a packaging atmosphere around the green bananas; and
  (C) maintaining the sealed bag at the temperature of 13-18° C.

In an eleventh aspect, this invention relates to the use, in packaging bananas, of a container including at least one permeable control member which provides a pathway for $O_2$ and $CO_2$, and which comprises a gas-permeable membrane comprising
  (1) a microporous film, and
  (2) a polymeric coating on the microporous film.

DETAILED DESCRIPTION OF THE INVENTION

In the Summary of the Invention above and in the Detailed Description of the Invention, the Examples, and the Claims below, reference is made to particular features of the invention. It is to be understood that the disclosure of the invention in this specification includes all appropriate combinations of such particular features. For example, where a particular feature is disclosed in the context of a particular aspect or embodiment of the invention, or a particular claim, that feature can also be used, to the extent appropriate, in the context of other particular aspects and embodiments of the invention, and in the invention generally.

In describing and claiming the invention below, the following abbreviations, definitions, and methods of measurement are used. OTR is $O_2$ permeability. COTR is $CO_2$ permeability. EtTR is ethylene transmission rate. OTR, COTR and EtTR values are given in ml/m².atm.24 hrs; in some cases, the equivalent in cc/100 inch².atm.24 hrs is given in parentheses. OTR and COTR values referred to herein can be measured using a permeability cell (supplied by Millipore) in which a mixture of $O_2$, $CO_2$ and helium is applied to the sample, using a pressure of 0.7 kg/cm² (10 psi) except where otherwise noted, and the gases passing through the sample were analyzed for $O_2$ and $CO_2$ by a gas chromatograph. The cell could be placed in a water bath to control the temperature. The abbreviation $P_{10}$ is used to denote the ratio of the oxygen permeability at a first temperature $T_1$° C. to the oxygen permeability at a second temperature $T_2$, where $T_2$ is $(T_1-10)$° C., $T_1$ being 10° C. and $T_2$ being 0° C. unless otherwise noted. The abbreviation R or R ratio is used to denote the ratio of $CO_2$ permeability to $O_2$ permeability, both permeabilities being measured at 20° C. unless otherwise noted. Pore sizes given in this specification are measured by mercury porosimetry or an equivalent procedure. Parts and percentages are by weight, except for percentages of gases, which are by volume; temperatures are in degrees Centigrade, and molecular weights are weight average molecular weights expressed in Daltons. For crystalline polymers, the abbreviation $T_o$ is used to denote the onset of melting, the abbreviation $T_p$ is used to denote the crystalline melting point, and the abbreviation ΔH is used to denote the heat of fusion. $T_o$, $T_p$ and ΔH are measured by means of a differential scanning calorimeter (DSC) at a rate of 10° C./minute and on the second heating cycle. $T_o$ and $T_p$ are measured in the conventional way well known to those skilled in the art. Thus $T_p$ is the temperature at the peak of the DSC curve, and $T_o$ is the temperature at the intersection of the baseline of the DSC peak and the onset line, the onset line being defined as the tangent to the steepest part of the DSC curve below $T_p$.

Where reference is made herein to sealing bags containing bananas, it is to be understood that the sealing can be, but generally is not, hermetic sealing. Conventional methods for sealing bags of bananas can conveniently be used in this invention. Such conventional methods include, for example, the use of a cable tie to seal the neck of the bag. A seal made by conventional methods is not a hermetic seal, and has the advantage that it permits equilibration of the pressures inside and outside the bag. If the bag is sealed hermetically, it will generally be desirable to include one or more pinholes in the bag, to achieve such equilibration.

Control Members

As noted above, this invention preferably makes use of an atmosphere control member comprising (a) a microporous polymeric film, and (b) a polymeric coating on the microporous film. The microporous polymeric film preferably comprises a network of interconnected pores having an average pore size of less than 0.24 micron, with at least 70% of the pores having a pore size of less than 0.24 micron. Preferably the pores in the microporous film constitute 35 to 80% by volume of the microporous film. Preferred microporous films comprise a polymeric matrix comprising (i) an essentially linear ultrahigh molecular weight polyethylene having an intrinsic viscosity of at least 18 deciliters/g, or (ii) an essentially linear ultrahigh molecular weight polypropylene having an intrinsic viscosity of at least 6 deciliters/g, or (iii) a mixture of (i) and (ii). The microporous film may contain 30 to 90% by weight, based on the weight of the film, of a finely divided particulate substantially insoluble filler which is distributed throughout the film. A preferred process for preparing suitable microporous films comprises
  (A) preparing a uniform mixture comprising the polymeric matrix material in the form of a powder, the filler, and a processing oil;
  (B) extruding the mixture as a continuous sheet;
  (C) forwarding the continuous sheet, without drawing, to a pair of heated calender rolls;
  (D) passing the continuous sheet through the calender rolls to form a sheet of lesser thickness;
  (E) passing the sheet from step (D) to a first extraction zone in which the processing oil is substantially removed by extraction with an organic extraction liquid which is a good solvent for the processing oil, a poor solvent for the polymeric matrix material, and more volatile than the processing oil;
  (F) passing the sheet from step (E) to a second extraction zone in which the organic extraction liquid is substantially removed by steam or water or both; and
  (G) passing the sheet from step (F) through a forced air dryer to remove residual water and organic extraction liquid.

The polymeric coating on the control member preferably comprises a crystalline polymer having a peak melting temperature Tp of −5 to 40° C., e.g. 0 to 15° C., or 10 to 20° C., an onset of melting temperature T. such that ($T_p$-$T_o$) is less than 10° C., and a heat of fusion of at least 5 J/g. The polymer preferably comprises a side chain crystalline polymer moiety comprising, and optionally consisting of, units derived from (i) at least one n-alkyl acrylate or methacrylate (or equivalent monomer, for example an amide) in which the n-alkyl group contains at least 12, preferably at least 14, for example 16-50, preferably 16-22, carbon atoms, for example in amount 35-100%, preferably 50-100%, often 80-100%, and (ii) one or more comonomers selected from acrylic acid, methacrylic acid, and esters of acrylic or methacrylic acid in which the esterifying group contains less than 10 carbon atoms. The polymer can be a block copolymer in which one of blocks is a crystalline polymer as defined and the other block(s) is crystalline or amorphous. Preferred block copolymers comprise polysiloxane polymeric blocks, and (ii) crystalline polymeric blocks having a $T_p$ of −5 to 40° C. Such a polymer can be prepared by copolymerizing a mixture of reactants which comprises (i) at least one n-alkyl acrylate or methacrylate in which the n-alkyl group contains at least 12 carbon atoms and (ii) a polysiloxane having a copolymerizable group at one end thereof.

Other polymers which can be used to the coat the microporous film include cis-polybutadiene, poly (4-methylpentene), polydimethyl siloxane, and ethylene-propylene rubber.

The gas-permeable membrane preferably has one or more of the following properties
(i) a $P_{10}$ ratio, over at least one 10° C. range between −5 and 15° C. or between 10 and 20° C., of at least 2.0 to 2.8;
(ii) an oxygen permeability at all temperatures between 20° and 25° C. of 2,480,000 to 7,000,000 ml/m²·atm·24 hr. (160,000 to 450,000 cc/100 in²·atm·24 hr); and
(iii) an R ratio of at least 2.0, preferably at least 3.0, particularly at least 3.5.

In one embodiment, the control member comprises
(a) the gas-permeable membrane; and
(b) an apertured cover member which lies between the gas-permeable membrane and the air surrounding the package;
the gas permeable membrane having, in the absence of the apertured cover member,
  (i) an $O_2$ permeability, $OTR_{perm}$, of at least 155,000 ml/m²·atm·24 hr (10,000 cc/100 in²·atm·24 hr), and
  (ii) a permeability ratio, $R_{perm}$, of at least 2, and the apertured cover member being composed of
  (i) a barrier portion having an $O_2$ permeability, $OTR_{bar}$, which is less than 0.5 times, preferably less than 0.01 times, $OTR_{perm}$, and
  (ii) an aperture portion which comprises at least one aperture having an area of at least 0.015 in² and through which the gas-permeable membrane is exposed to the air surrounding the package, the aperture portion being such that the control member has a permeability ratio, $R_{control}$, which is at most 0.9, preferably at most 0.8, times $R_{perm}$, and which is preferably greater than 1.00.

The aperture portion of the cover member may have an area $A_{open}$ which is at most 0.04 times $A_{perm}$, where $A_{perm}$ is the area of the gas-permeable membrane. The aperture portion can consist of one or more apertures, each aperture having an area, $A_{aperture}$, less than 0.155 in². For further details of such atmosphere for control members, reference should be made to U.S. Pat. No. 6,013,293.

The permeability of the container, whether or not it includes an atmosphere control member, can be influenced by perforating the container in order to make a plurality of pinholes therein.

Ripening Bananas in an Ethylene Atmosphere

In the third and eight aspects of the invention, green bananas are ripened while in a sealed container. This method can be carried out in a conventional ripening room containing ethylene, typically but not necessarily at a concentration of 500 to 1000 ppm. It was surprising to discover that, when using suitable containers, it was unnecessary to follow the conventional practice of opening the bags, and that the bananas would ripen satisfactorily in this way. An important advantage of this method of ripening bananas is that the ripening takes place in a more controlled fashion, resulting in lower peak temperatures in the bananas, which in turn results in reduced dehydration of the bananas and reduced demand upon the refrigeration equipment when the ripening is carried out at temperatures below room temperature.

The temperature at which ripening is carried out and the concentration of ethylene in the atmosphere influence the rate at which ripening takes place. In general, slower ripening results in bananas which remain in a desired range of color stage for a longer period. On the other hand, this must be balanced against delivery dates required by retail outlets and inventory constraints. Generally the ethylene-containing atmosphere will be maintained at the temperature less than 22° C., preferably less than 20° C., for example 16-21° C.

The atmosphere within the bags will change substantially during the ripening process, as the bananas consume $O_2$ and generates $CO_2$. Preferably, the packaging atmosphere, for at least part of the period before the bananas reach their climacteric, contains at least 10% preferably at least 12%, particularly 14 to 19%, of $O_2$, and less than 10%, preferably less than 4%, of $CO_2$, with the total quantity of $O_2$ and $CO_2$ being less than 20%, preferably less than 17%. For at least part of the period after the bananas have passed their climacteric, the packaging atmosphere preferably contains at least 0.8%, preferably 1.5 to 6%, especially 1.5 to 3%, of $O_2$, and less than 15%, preferably less than 7%, of $CO_2$, with the total quantity of $O_2$ and $CO_2$ being less than 16%, preferably less than 10%.

Ripening Bananas Using a Source of Ethylene within the Container

In the third and ninth aspects of the invention, green bananas are ripened by means of a source of ethylene placed with the bananas in the sealed container. This aspect of the invention is particularly useful for ripening bananas while they are being transported, for example on a ship. The ripening process can be controlled so that the bananas are at a desired color stage when the bananas reach their destination. During the ripening process, there is no need to alter the normal atmosphere in which the bags of bananas are being transported (though the invention does not exclude the possibility that a controlled atmosphere is used). The source of ethylene can make ethylene available immediately after packaging the bananas, or after a desired delay.

In these aspects of the invention, relatively slow ripening of the bananas is generally desired, and in consequence the temperature around the bags of bananas is generally controlled, during at least part of the ripening process, at a temperature less than 18° C., preferably less than 16° C., for example at 14-15° C.

Any convenient source of ethylene can be used. I have obtained good results using 2-chloroethyl phosphonic acid, which is often referred to herein as 2CPA. 2CPA can be used in the form of an aqueous solution, for example of concentration 3-4%. The rate at which 2CPA generates ethylene increases with increasing pH of the aqueous solution, which can be adjusted, for example to more than 4, particularly more than 7, by the addition of suitable materials, for example buffer solutions and/or sodium bicarbonate solutions. In one embodiment, a 2CPA solution and any pH adjuster are adsorbed on the same or different absorbent pads, e.g. paper pads, and the pad(s) placed in the bottom of the bag and covered with a polymeric sheet before the bananas are placed in the bag. In another embodiment, a solution of 2CPA is applied to the green bananas, for example by dipping or spraying, before the bananas are placed in the bag.

As in the aspects of the invention which involve ripening in an ethylene-containing atmosphere, the atmosphere within the sealed bags containing the source of ethylene will change during the ripening process. The atmospheres in the bag, for at least part of the periods before and after the climacteric, are preferably as stated above when the bananas are ripened in an ethylene-containing atmosphere.

Quantities of Bananas

The invention can in principle be used for any quantity of bananas. However, when the invention is used for ripening bananas, or for storing green bananas, it is particularly valuable when relatively large quantities are involved. Thus it is generally preferred that the sealed container contains at least 4 kg, preferably least 15 kg, especially 16 to 22 kg of bananas. However, in the sixth aspect of the invention, much smaller quantities (1 to 2.5 kg (2 to 5 lb.) are used in order to increase the shelf life of the bananas at a desired color stage.

EXAMPLES

The invention is illustrated in the following Examples, a number of which are comparative Examples, designated by the letter C before the number of the example. The bananas, bags and control members used in the Examples were as follows.

Bananas

The bananas were Cavendish bananas, from Ecuador in Examples 1 A-B, C11 -12, 2, C2, 4A-B and C41-42, from Costa Rica in Examples 5 A-C and C5, and from Colombia in the other Examples.

Bags

The large bags were about 0.96 m (38 in.) wide and about 1.2 m (50 in.) long, and were made from polyethylene film about 0.056 mm (2.2 mil) thick (available from Roplast Industries under the tradename RA 3030). The polyethylene film had an OTR at 13° C. of about 2915 (188) and at 22° C. of about 4,650 (300), and EtTR at 13° C. of about 11,400 (735) and at 22° C. of about 18,100 (1,170), an R ratio of about 4.5, and a P10 ratio (between 0 and 10° C.) of about 1.76. The small bags were about 0.3 m (12 in.) wide and about 0.46 m (18 in.) long, and were made from the same polyethylene film.

Control Members

The Type S control members were as described in copending commonly assigned U.S. application Ser. No.09/121,082 and corresponding International Publication No. WO 00/04787 and comprised a microporous polyethylene film coated with a polysiloxane/SCC block copolymer. The Type S members had an OTR at 13° C. of about 3,803,850 (245, 410) and at 22° C. of about 5,000,000 (324,000), an EtTR at 13 °C. of about 16,280,000 (1,050,300) and at 22° C. of about 19,500,000 (1,260,000), an R ratio of about 3.8, and a P10 ratio (between 0 and 10° C.) of about 1.8. The microporous polyethylene film contained 50-60% silica, had a thickness of about 0.18 mm (0.007 inch), a tear strength of about 90 g, a porosity of about 65%, an average pore size of about 0.1 micron and a largest pore size of 4-10 microns (available from PPG industries under the tradename Teslin SP 7). The block copolymer was prepared by the reaction of a polydimethyl siloxane terminated one end only by a methacryloxypropyl group (available from Gelest under the tradename MCR M 17), 40 parts, dodecyl acrylate, 26.8 parts and tetradecyl acrylate, 33.2 parts, as described in Example A7 of U.S. application Ser. No. 09/121,082 and corresponding International Publication No. WO 00104787.

The Type A control members were as described in copending commonly assigned U.S. application Ser. No. 08/759,602 and corresponding International Publication No. WO 96/38495, and comprised the same microporous polyethylene film coated with an SCC polymer of dodecyl acrylate, 42 parts, tetradecyl acrylate, 53 parts, and acrylic acid, 5 parts. The Type A members had an OTR at 22° C. of about 1,705, 000 (110,000), an R ratio of about 4, and a P10 ratio (between 0 and 10° C.) of about 1.4.

In each Example, the control member was secured to a portion of the bag in which one or more round holes had been cut. The effective area of the control member is about equal to the area of the hole or holes in the portion of the bag to which the control member is attached. However, in Examples 1A-B, C11-12, 2, C2, 3A-D and C31-33, the periphery of the control member was heat sealed to the interior of the bag, thus creating a control member of the kind described in U.S. Pat. No. 6,013,293. In the other Examples, the control member was secured to the exterior of the bag by means of a layer of a pressure sensitive adhesive on the peripheral margin of the control member.

The color stages referred to in the Examples are those accepted by the industry and as shown below.

| Color stage | Description |
| --- | --- |
| 1 | 95% green |
| 2 | 80% green, 20% slightly yellow |
| 3 | 50% yellow, 50% green |
| 4 | 80% yellow, 20% light green |
| 5 | 95% yellow, with slight green color at stem and blossom end |
| 6 | 100% yellow |
| 7 | 100% yellow with brown sugar spots |

Bananas are preferably at color stage 3.5 to 5 when put on retail sale.

Many of the Examples are summarized in Tables 1-8 below. In the Tables, when more than one result is given for a particular Example, this reflects the fact that more than one test was carried out under the same conditions.

Examples 1A-B, C11-12,2 and C2

Each of these Examples uses a large bag. In Examples C11,1 A-B and 2, each bag has one S-type control member placed under two or more holes in the bag. In Example C11, the control member had an area of 1935 mm² (3 in²) and was placed under two holes, each of diameter 20.6 mm (0.81 in.). In Example 1A, the control member had an area of 6450 mm² (10 in²) and was placed under 6 holes, each of diameter 20.6 mm (0.81 in.). In Examples 1 B and 2, the control member had an area of 12,900 mm² (20 in²) and was placed under 6 holes, each of diameter 28.7 mm (1.13 in). Each bag was packed with about 20 kg (44 lb) of green bananas. The bananas had been harvested at week 11 and maintained at 13-14° C. for about 11 days after harvest before being packed. Except in Examples C12 and C2, excess air was extracted from the bags using a vacuum pump, and the bags were then sealed using tie wraps. In Examples C12 and C2, the bags were left open. The bags were maintained at 13° C. for an extended time, Examples 1A, 1B, C11 and C12 being terminated at day 62, and Examples 2 and C2 being terminated at day 40. The results are given in Table 1 below. In Example 2, traces of ethylene (generated by the ripening of the bananas) remained in the test chamber from Example 1 and caused the bananas to ripen more rapidly than in the otherwise substantially identical Example 1B. This demonstrates the desirability of excluding ethylene when long storage periods are needed (and conversely, the ability to accelerate ripening when desired).

Except in Example C34, excess air was extracted from the bags using a vacuum pump, and then securely tied (the bags were not, however, as completely sealed as in Examples 1 and 2). In Example C34, the bags were left open. The sealed bags were cooled to about 13° C. and shipped to Gulfport, Miss., and then to San Francisco, Calif., maintaining the temperature at about 13° C. In San Francisco, 36 days after packing, half the bags in each Example were opened, and the other half left intact. All the bags were then exposed to ethylene (500-1000 ppm) in a commercial ripening room for about 24 hours. The bananas in the opened bags ripened rapidly in the expected way; thus by day 43, their color was 6, by day 46 their color was greater than 7, and by day 49, they were overripe. The bags which were still sealed were opened on day 49. The results for the bags opened on day 49 are shown in Table 2 below. These Examples demonstrate that bananas

TABLE 1

| | Example No. | | | | | |
| --- | --- | --- | --- | --- | --- | --- |
| | C11 | 1A | 1B | C12 | 2 | C 2 |
| Control member | yes | yes | yes | no | yes | no |
| Total area of holes in bag under control members (mm²) | 670 | 2000 | 3880 | — | 3880 | — |
| Color stages | | | | | | |
| first change at day | >62 | 44 | 44 | 12 | 26 | 15 |
| days to change from 3.5 to 4.5 | — | — | — | — | 4.5 | * |
| days to change from 3.5 to 5 | — | ** | 11 | 7 | # | * |
| Weight loss (%) on day 26 | — | — | — | — | 0.35 | 3.7 |
| on day 41 | 0.38 | 0.45 | 0.60 | 4.73 | — | — |
| Taste and texture on day 40 | — | — | — | — | Exct | ♦ |
| on day 62 | UGH | Exct | Exct | Overripe | — | |
| % O₂ (approximate) | | | | | | |
| at day 7 | 5.1 | 11.9 | 13.8 | atm | — | atm |
| at day 8 | — | — | — | atm | 14.35 | atm |
| at day 47 (after climacteric) | 5.0 | 0.96 | 2.2 | atm | 2.15 | atm |
| % CO₂ (approximate) | | | | | | |
| at day 7 | 5.3 | 3.6 | 3.05 | atm | — | atmt |
| at day 8 | — | — | — | atm | 3.05 | atm |
| at day 29 (after climacteric) | — | — | — | atm | 8.0 | atm |
| at day 47 (after climacteric | 5.3 | 7.9 | 8.4 | atm | — | atm |

UGH unripe, green and hard.
* the bananas had a color of 4.5 when the test was terminated at day 62
Exct excellent taste and texture
test terminated at this point; extrapolation indicates that time to change from color 3.5 to 5 would be 5.9 days.
♦ Bananas removed on day 26 because they were over-ripe.

Examples 3 and C31-33

Each of these Examples uses a large bag. In Examples C31-33 and 3, each bag has one S-type control member placed under one or more holes in the bag. In Example C31, the control member had an area of 967 mm² (1.5 in²) and was placed under a single hole of diameter 20.6 mm (0.81 in.). In Example C32, the control member had an area of 1935 mm² (3 in²) and was placed under 2 holes, each of diameter 20.6 mm (0.81 in.). In Example C33, the control member had an area of 3225 mm² (5 in²) and was placed under 4 holes, each of diameter 19 mm (0.75 in.). In Example 3, the control member had an area of 12,900 mm² (20 in²) and was placed under 6 holes, each of diameter 25 mm (1 in.). In Example C34, the bag did not have a control member. Each bag was packed with about 18.1 kg (40 lb) of green bananas. The bananas had been harvested at week 13, and maintained at 13-14° C. for about 11 days after harvest before being packed.

harvested at 13 weeks can be transported in a suitably designed bag, and can be ripened into an excellent product by exposure to ethylene, either through the bag or after opening the bag.

TABLE 2

| | Example No. | | | | |
| --- | --- | --- | --- | --- | --- |
| | C31 | C32 | C33 | 3 | C 34 |
| Control member | yes | yes | yes | yes | no |
| Total area of hole(s) in bag under control member (mm²) | 335 | 670 | 1140 | 3040 | — |
| Days to change from color stage 3.5 to color stage 5 | >8 | >8 | >8 | 5.5 | DDU |

TABLE 2-continued

|  | Example No. | | | | |
| --- | --- | --- | --- | --- | --- |
|  | C31 | C32 | C33 | 3 | C 34 |
| Taste and texture on day 49 | SGU | SGU | SGU | Exct | DDU |
| % $O_2$ (approximate) | | | | | |
| at day 23 | 8.6 | 9.8 | 12.7 | 15.5 | |
| at day 46 | 2.9 | 0.6 | 1.8 | 2.2 | |
| % $CO_2$ (approximate) | | | | | |
| at day 23 | 4.45 | 3.65 | 3.3 | 2.85 | |
| at day 46 | 13.8 | 11.4 | 5.0 | 9.0 | |

SGU soft, green and unpalatable
DDU dehydrated, decayed and unpalatable by day 47 (day 11 after exposure to ethylene)
Exct excellent taste and texture Examples 4A, 4B, C41 and C42

Each of these Examples uses a small bag. In Examples 4A-B, each bag has one A-type control member placed over four or five holes in the bag. In Example 4A, the control member had an area of 145 mm² (5.7 in²) and was placed over four holes each of diameter 19 mm (0.75 in.). In Example 4B, the control member had an area of 4516 mm² (7 in²) and was placed over 5 holes, each of diameter 19 mm (0.75 in.). In Example C41, the control member and the holes under it were as in Example 4A, except that the control member was an uncoated microporous film. In Example C42, the bag was intact except for 200 pinholes each about 0.5 mm (26 gauge) in diameter. Each bag was packed with about 1.35 kg (3 lb) of green bananas which had been maintained at 13-14° C. for about 11 days after harvest. Except in Example C42, excess air was extracted from the bags using a vacuum pump, and the bags were then securely tied. In Example C42, the bags were left open. After three days, to allow the packaging atmosphere to equilibrate, the bags were exposed to ethylene (500-1000 ppm) in a ripening room. The results are shown in Table 3 below. These Examples demonstrate that small quantities of bananas can be ripened in a suitably designed bag, and can remain in the bag in excellent condition for several days longer than bananas exposed to the air.

TABLE 3

|  | Example No. | | | |
| --- | --- | --- | --- | --- |
|  | 4A | 4B | C41 | C42 |
| Control member | yes | yes | ♣ | no |
| Total area of holes in bag over control member (mm²) | 1140 | 1425 | 1140 | — |
| Color stage on day 10 after ethylene treatment | 4.0 | 4.4 | 7.0 | 6.8 |
| Weight loss (%) on day 10 after ethylene treatment | 0.57 | 0.72 | 1.05 | 0.61 |
| Taste & texture on day 10 after ethylene treatment | Exct | Exct | Over-ripe | Over-ripe |

♣uncoated micropouour film
Exct excellent taste and texture

Examples 5A, 5B, 5C and C5

These Examples show that the bananas generate heat more evenly when ripened in a container including an atmosphere control member. In each Example, a large bag was packed with about 18.1 kg (40 lb.) of green bananas. The green bananas had been harvested 13 days previously and had been stored at 13-14° C. since harvest. A temperature sensor (available from Sensitech, Beverly, Mass., under the tradename Temptale P) was inserted into one banana in each bag. In each of Examples 5A, 5B and 5C, the bag had two S-type control members, each having an area of 11,300 mm² (17.5 in²). Each control member was placed over a single hole in the bag, the hole having an diameter of 70 mm (2.75 in.) in Example 5A, 74.4 mm (2.93 in.) in Example 5B, and 78.7 mm (3.1 in.) in Example 5C. In Example C5, the bag was perforated so that the bananas were surrounded by air. The bags were then sealed with rubber bands. The sealed bags were placed in a refrigerated room at about 13° C. After about 84 hours, the temperature of the room was raised to about 16.7° C. and after about 12 hours, an ethylene generator was used to provide an initial ethylene concentration in the room of 500-1000 ppm. About 24 hours after the generation of ethylene had begun, the room was vented. The temperature of the bananas was monitored for about 15 days, and reached a peak at about 60 hours after the generation of ethylene had begun. At that time, the concentration of $O_2$ and $CO_2$ was measured. The results are shown in Table 4 below. It will be seen that the peak temperature was substantially lower in the bags containing control members than in the perforated bag.

TABLE 4

|  | Example No. | | | |
| --- | --- | --- | --- | --- |
|  | 5A | 5B | 5C | C5 |
| Control member | yes | yes | yes | no |
| Total area of holes in bag under control members (mm²) | 7700 | 8700 | 9700 | — |
| Temperature (° C.) of bananas 12 hrs after temperature of room was set to 16.7° C. | 16.3 | 15.9 | 15.7 | 16.6 |
| Peak Temperature ° C. | 21.2 | 21.1 | 20.9 | 23.9 |
| Difference between peak temperature and 16.6° C. | 4.9 | 5.3 | 5.2 | 7.3 |
| % $O_2$ 60 hours after injection of ethylene | 2.2 | 1.75 | 1.9 | 20.95 |
| % $CO_2$ 60 hours after injection of ethylene | 7.95 | 6.1 | 7.4 | 0.03 |

Examples 6 A-E

Each of these Examples uses a large bag having two S-type control members, each control member having an area of 11,300 mm² (17.5 in²). Each control member was placed over seven holes in the bag, each hole of diameter 25.4 mm (1 in). A paper pad about 300×400 mm (12×16 in.) impregnated with an aqueous solution of 2CPA (3.9%) was placed in the bottom of each bag and covered with a sheet of polyethylene. The amount of the solution varied from Example to Example, and is shown in Table 5 below. About 18.1 kg (40 lb.) of green bananas were then placed in each bag, and the bags were sealed with rubber bands. The green bananas had been maintained at 13-14° C. for about 11 days after harvest. The sealed bags were left in a cold room at 13-14° C. The color stage of the bananas was monitored, and Table 5 below shows the time in days taken to reach color stages 4 and 5.5.

TABLE 5

| | Example No. | | | | |
|---|---|---|---|---|---|
| | 6A | 6B | 6C | 6D | 6E |
| Control member | yes | yes | yes | yes | yes |
| Total area of holes in bag under control members (mm²) | 7100 | 7100 | 7100 | 7100 | 7100 |
| mL of 3.9% 2CPA solution on paper pad | 30 | 50 | 100 | 200 | 500 |
| Days to color stage 4 | 11 | 10.8 | 10.6 | 11 | 9.6 |
| | * | 20.4 | 20.1 | 12 | 12 |
| | * | 10.5 | 11 | 11 | 11 |
| Days to color stage 5.5 | 17.5 | * | 17.4 | 16 | 16.1 |
| | * | * | 24.2 | 16 | 16.9 |
| | * | 17.5 | 17.4 | 16 | 16.3 |
| Days from color stage 4 to color stage 5.5 | 6.5 | — | 6.8 | 5 | 6.5 |
| | — | — | 3.1 | 4 | 4.9 |
| | — | 7 | 6.4 | 5 | 5.3 |

* this color stage had not been reached when the experiment was terminated after 27 days.

Examples 7 A-D and C71-74

The procedure of Example 6 was followed except for the changes noted below.

1. In Examples 7A-D, there was a single hole, diameter 82.5 mm (3.25 in.), under each of the two control members. The total area of the holes was 10,700 mm²
2. In Examples 7A, 7B and 7C and in comparative Examples C72 and C73, a paper pad impregnated with 0.1N NaHCO₃ solution was placed adjacent to the paper pad impregnated with 2CPA solution, thus increasing the pH of the 2CPA solution and increasing the rate at which ethylene was generated. The amount of the NaHCO₃ solution varied from Example to Example as shown in Table 6 below.
3. In Examples 7D and C74, 2CPA was not used, but three days after packing, the bags were exposed to ethylene for 24 hours in a conventional ripening room at 16.7° C. and containing 500-1000 ppm of ethylene.
4. Comparative Examples C71-74 were carried out in which no ethylene was used (C71), or the bag was sealed but did not have a control member (C 72-73), or the bag was not sealed (C74).
5. The ethylene concentration in the bags was measured at various times after packing.

The results obtained are shown in Table 6 below.

TABLE 6

| Example No. | 7A | 7B | 7C | 7D | C71 | C72 | C73 | C74 |
|---|---|---|---|---|---|---|---|---|
| Control member | yes | yes | yes | yes | yes | no | no | no |
| mL 3.9% 2CPA solution | 30 | 30 | 30 | no | no | 30 | 30 | no |
| mL 0.1N NaHCO₃ | 15 | 30 | 60 | no | no | 13 | 30 | no |
| Exposed to ethylene in ripening room | no | no | no | yes | no | no | no | yes |
| Days to color stage 4 | 12 | 10.2 | 6.2 | 6.5 | | | | 4.2 |
| | 12.5 | 10.2 | 9.4 | 6.5 | | | | 4.5 |
| | 15 | 8.4 | 9.8 | 7.1 | | | | 4.5 |
| Days to color stage 5.5 | * | * | 9.5 | 11.5 | | | | 6.6 |
| | * | * | 12.5 | 12 | | | | 7 |
| | * | * | 12.9 | 12.3 | | | | 7.2 |
| Days from color stage 4 to color stage 5.5 | — | — | 3.3 | 5 | | | | 2.4 |
| | — | — | 3.1 | 5.5 | | | | 2.5 |
| | — | — | 3.1 | 5.2 | | | | 2.7 |
| Color after 15 days | | | | | 2 | 2 | 2 | |
| ppm ethylene after | | | | | | | | |
| 0 hrs | | 0.47 | 4.11 | 8.65 | | | 5.72 | 10.7 |
| 7 hrs | | 0.58 | 2.36 | 10.04 | | | 7.81 | 13.35 |
| 72 hrs | | 0.68 | 1.94 | 6.66 | | | 10.85 | 20.51 |
| 79 hrs | | — | 3.28 | 4.7 | | | 9.43 | 16.65 |
| % O₂ after 15 days | 3.73 | 3.97 | 3.72 | | | | 0.21 | 0.34 |
| % CO₂ after 15 days | 6.23 | 6.2 | 4.67 | | | | 27.3 | 25.5 |

* this color stage had not been reached when the experiment was terminated.

Examples 8A-J and C81-83

Examples 8A-J and C 81-83 followed the same procedure as Examples 7A-C and C71-74 except for the changes noted below.
1. The ethylene, $O_2$ and $CO_2$ concentrations were determined at different times.
2. In some of the examples, the second paper pad was impregnated with 30 mL of an aqueous buffer solution (i) containing potassium phthalate and having a pH of 4, (ii) containing dibasic sodium phosphate, monobasic potassium phosphate, sodium chromate and potassium dichromate, and having a pH of 7, or (iii) containing sodium carbonate and sodium bicarbonate and having a pH of 10. These buffer solutions are available from Orion Research Inc., Beverley, Mass. USA
3. In Examples 8H and C83, the bag was taken to the ripening room 3 days after packing.
4. In Example 8G, the sealed bags were left in a room at about 21° C. (in the other Examples, the room was at 13-14° C.).
5. In Example C83, the bag was not sealed.

The results are shown in Table 7 below.

concentration of the 2CPA varied from Example to Example as shown in Table 8 below.
4. Comparative Examples C91 and C92 were carried out in which the bag did not have a control member (C91) or the bananas were not treated with 2CPA solution (C92). Comparative Example C91 is the same as the comparative Example C71.

The results obtained are shown in Table 8 below.

TABLE 8

| | Example No. | | | |
|---|---|---|---|---|
| | 9A | 9B | C91 | C92 |
| Control Member | yes | yes | no | yes |
| Concentration of 2CPA (ppm) | 1116 | 128 | 1116 | 0 |
| Days to color stage 4 | 11.9 | 14.6 | * | * |
| | 10 | * | * | * |
| | 11.9 | 11 | * | * |
| Days to color stage 5.5 | * | * | * | * |
| | * | * | * | * |
| | * | * | * | * |

* this color stage had not been reached when the experiment was terminated after 27 days

TABLE 7

| | 8A | 8B | 8C | 8D | 8E | 8F | 8G | 8H | C81 | C82 | C83 |
|---|---|---|---|---|---|---|---|---|---|---|---|
| Control member | yes | yes | yes | yes | yes | yes | yes | yes | yes | no | no |
| mL 3.9% 2CPA solution | 30 | 30 | 30 | 30 | 30 | 30 | 30 | no | no | 30 | no |
| mL 0.1N NaHCO$_3$ | no | no | no | 45 | 60 | 75 | 60 | no | no | 60 | no |
| 30 mL of buffer having | pH 4 | pH 7 | pH 10 | no | no | no | no | no | no | no | no |
| Exposed to ethylene in ripening room | no | no | no | no | no | no | no | yes | no | no | yes |
| Days to color stage 4 | 11.9 | 15.4 | 13.1 | 9.4 | 8.5 | 9.0 | 8.2 | 7.7 | * | * | 3.7 |
| | 13.0 | 11.3 | 11.5 | 9.0 | 9.3 | 8.1 | 7.6 | — | — | — | 3.9 |
| | 14.3 | 10.1 | 10.8 | 10.1 | 8.0 | 8.1 | 6.7 | 10.6 | — | — | 3.9 |
| Days to color stage 5.5 | — | — | — | 15.7 | 13.8 | 12.4 | 14.8 | 14 | * | * | 5 |
| | — | 15.3 | — | 12.3 | 13.1 | 11.4 | 12.2 | — | — | * | 6 |
| | — | — | 16.6 | 15 | 11.9 | 11.4 | 9.0 | * | — | — | 6 |
| Days from color stage 4 to color stage 5.5 | * | * | — | 6.3 | 5.3 | 3.4 | 6.2 | 6.3 | — | — | 1.3 |
| | * | 4 | — | 3.3 | 3.8 | 3.3 | 4.6 | — | — | — | 2.1 |
| | * | * | 5.8 | 4.9 | 3.9 | 3.3 | 2.3 | — | — | — | 2.1 |
| ppm ethylene after 24 hrs | 0.88 | 1.67 | 1.37 | 3.25 | 4.39 | 5.58 | 10.9 | 0.49 | 0.39 | 39.5 | 0 |
| % O$_2$ after 8 days | 3.72 | 5.58 | 2.93 | 3.2 | 2.39 | 2.52 | 1.95 | 2.97 | 17 | 0.3 | — |
| % CO$_2$ after 8 days | 4.73 | 4.7 | 5.3 | 4.97 | 5.13 | 5.47 | 7.97 | 4.73 | 1 | 17.6 | — |

* this color stage had not been reached when the experiment was terminated after 17 days.

Examples 9A-C and C91-92

The procedure of Example 6 was followed, except for the changes noted below.
1. There was a single hole, diameter 82.5 mm (3.25 in.), under each control member. The total area of the hole was 5350 mm$^2$.
2. No 2CPA-impregnated paper pad was placed in the bag.
3. The bananas, before being packed into the bag, were dipped into a dilute aqueous solution of 2CPA. The Table 9 below shows, for each of the bags in Examples 5A-C, 6A-E and 7A-E, the permeability of the bag to O$_2$ and to ethylene ("Et" in Table 9), and the respective contributions of the control member and the remainder of the bag. For this calculation, the size of the bag, after sealing, was assumed to be 0.96×1.04 m (38 in.×41 in.), i.e. to have a total area of 2 m$^2$ (3115 in$^2$).

TABLE 9

| Example No. | Perm. of bag (mL/atm.24 hr) at 13° C. | | Perm. of bag at 13° C./kg of bananas | | Hole area (m²) | Perm. Of ACM at 13° C. | | Perm. of rest of bag at 13° C. | |
|---|---|---|---|---|---|---|---|---|---|
| C11 | O₂ | 8,450 | O₂ | 470 | 0.000670 | O₂ | 2,550 | O₂ | 5,900 |
|  | Et | 36,000 | Et | 2,000 |  | Et | 10,900 | Et | 25,100 |
| 1A | O₂ | 13,500 | O₂ | 745 | 0.002000 | O₂ | 7,600 | O₂ | 5,900 |
|  | Et | 57,650 | Et | 3,185 |  | Et | 32,550 | Et | 25,100 |
| 1B | O₂ | 20,650 | O₂ | 1,140 | 0.003880 | O₂ | 14,750 | O₂ | 5,900 |
|  | Et | 88,250 | Et | 4,875 |  | Et | 63,130 | Et | 25,100 |
| 2 | O₂ | 20,650 | O₂ | 1,140 | 0.003880 | O₂ | 14,750 | O₂ | 5,900 |
|  | Et | 88,250 | Et | 4,875 |  | Et | 63,130 | Et | 25,100 |
| C31 | O₂ | 7,200 | O₂ | 395 | 0.000335 | O₂ | 1,300 | O₂ | 5,900 |
|  | Et | 30,650 | Et | 1,695 |  | Et | 5,500 | Et | 25,100 |
| C32 | O₂ | 8,500 | O₂ | 470 | 0.000670 | O₂ | 2,550 | O₂ | 5,900 |
|  | Et | 36,000 | Et | 2,000 |  | Et | 10,900 | Et | 25,100 |
| C33 | O₂ | 10,250 | O₂ | 565 | 0.001140 | O₂ | 4,350 | O₂ | 5,900 |
|  | Et | 43,650 | Et | 2,400 |  | Et | 18,550 | Et | 25,100 |
| 3 | O₂ | 17,450 | O₂ | 965 | 0.003040 | O₂ | 11,550 | O₂ | 5,900 |
|  | Et | 74,600 | Et | 4,120 |  | Et | 49,500 | Et | 25,100 |
| 5 A | O₂ | 35,000 | O₂ | 1,935 | 0.007700 | O₂ | 29,100 | O₂ | 5,900 |
|  | Et | 149,800 | Et | 8,280 |  | Et | 124,700 | Et | 25,100 |
| 5B | O₂ | 39,000 | O₂ | 2,155 | 0.008700 | O₂ | 33,100 | O₂ | 5,900 |
|  | Et | 166,650 | Et | 9,200 |  | Et | 141,550 | Et | 25,100 |
| 5C | O₂ | 42,900 | O₂ | 2,370 | 0.009700 | O₂ | 37,000 | O₂ | 5,900 |
|  | Et | 183,550 | Et | 10,150 |  | ET | 158,450 | Et | 25,100 |
| 6 A–E | O₂ | 32,840 | O₂ | 1,815 | 0.007100 | O₂ | 26,940 | O₂ | 5,900 |
|  | Et | 140,500 | Et | 7,750 |  | ET | 115,400 | Et | 25,100 |
| 7 A–E | O₂ | 46,500 | O₂ | 2,570 | 0.010700 | O₂ | 40,600 | O₂ | 5,900 |
|  | Et | 199,200 | Et | 11,000 |  | Et | 174,100 | Et | 25,100 |

What is claimed is:

1. A package which is at a temperature of 13-18° C. and which comprises
    (a) a sealed container, and
    (b) within the sealed container, at least 4 kg of bananas which have not yet commenced their climacteric, and a packaging atmosphere around the bananas;
    the sealed container having an $O_2$ permeability at 13° C., per kg of bananas in the container (OP13/kg), of at least 1500 ml/atm.24 hrs, an R ratio at 13° C. of at least 3, and an ethylene permeability at 13° C., per kg of bananas in the container (EtOP13/kg) which is at least 3 times the OP13/kg of the container; and the packaging atmosphere being an equilibrium atmosphere in which the oxygen content has a substantially constant value which is from 14 to 19%, the carbon dioxide content has a substantially constant value which is less than 10%, and the total quantity of oxygen and carbon dioxide has a substantially constant value which is less than 20%.

2. A package according to claim 1 wherein the container includes at least one permeable control member which provides a pathway for $O_2$, $CO_2$ and ethylene to enter or leave the packaging atmosphere and which comprises a gas permeable membrane comprising
    (a) a microporous polymeric film, and
    (b) a polymeric coating on the microporous film.

3. A package according to claim 2 wherein the gas-permeable membrane
    (i) has a $P_{10}$ ratio, over at least one 10° C. range between −5 and 25° C. of at least 1.5, and
    (ii) has an oxygen permeability (OTR), at all temperatures between 13 and 25° C., of at least 2,480,000 ml/m².atm.24 hrs (160,000 cc/100 inch².atm.24 hrs).

4. A package according to claim 3 wherein the microporous polymeric film comprises a network of interconnected pores having an average pore size of less than 0.24 micron, with at least 70% of the pores having a pore size of less than 0.24 micron.

5. A package according to claim 4 wherein
    (1) the pores in the microporous film constitute 35 to 80% by volume of the microporous film; and
    (2) the microporous film comprises
        (a) a polymeric matrix comprising (i) an essentially linear ultrahigh molecular weight polyethylene having an intrinsic viscosity of at least 18 deciliters/g, or (ii) an essentially linear ultrahigh molecular weight polypropylene having an intrinsic viscosity of at least 6 deciliters/g, or (iii) a mixture of (i) and (ii); and
        (a) 30 to 90% by weight, based on the weight of the film, of a finely divided particulate substantially insoluble filler which is distributed throughout the film.

6. A package according to claim 1 wherein the packaging atmosphere is free of ethylene which has been added to the packaging atmosphere from a source of ethylene other than the bananas themselves.

7. A package according to claim 1 wherein the sealed container contains only the bananas.

8. A package which is at a temperature of 13-18° C. and which comprises
    (a) a sealed container which comprises
        (i) a polyethylene bag, and
        (ii) at least one permeable control member which provides a pathway for $O_2$, $CO_2$ and ethylene to enter or leave the packaging atmosphere and which comprises a gas-permeable membrane comprising a microporous polymeric film, and a polymeric coating on the microporous film; and
    (b) within the sealed container, at least 4 kg of bananas which have not yet commenced their climacteric, and a packaging atmosphere around the bananas; and
    the sealed container having an $O_2$ permeability at 13° C., per kg of bananas in the container (OP13/kg), of at least 1500 ml/atm.24 hrs, an R ratio at 13° C. of at least 3, and an ethylene permeability at 13° C., per kg of bananas in the container (EtOP13/kg) which is at least 3 times the OP13/kg of the container; and the packaging atmosphere (i) being an equilibrium atmosphere in which the oxygen content has a substantially constant value which is from 14 to 19%, the carbon dioxide content has a substantially constant value which is less than 10%, and the total quantity of oxygen and carbon dioxide has a substantially constant value which is less than 20%, and (ii) being free of ethylene which has been added to the packaging atmosphere from a source of ethylene other than the bananas themselves.

9. A package according to claim 8 wherein the gas-permeable membrane (i) has a $P_{10}$ ratio, over at least one 10° C. range between −5 and 25° C. of at least 1.5, and (ii) has an oxygen permeability (OTR), at all temperatures between 13 and 25° C., of at least 2,480,000 ml/m$^2$.atm.24 hrs (160,000 cc/100 inch$^2$.atm.24 hrs).

10. A package according to claim 9 wherein the microporous polymeric film comprises a network of interconnected pores having an average pore size of less than 0.24 micron, with at least 70% of the pores having a pore size of less than 0.24 micron.

11. A package according to claim 10 wherein (1) the pores in the microporous film constitute 35 to 80% by volume of the microporous film; and (2) the microporous film comprises (a) a polymeric matrix comprising (i) an essentially linear ultrahigh molecular weight polyethylene having an intrinsic viscosity of at least 18 deciliters/g, or (ii) an essentially linear ultrahigh molecular weight polypropylene having an intrinsic viscosity of at least 6 deciliters/g, or (iii) a mixture of (i) and (ii); and (b) 30 to 90% by weight, based on the weight of the film, of a finely divided particulate substantially insoluble filler which is distributed throughout the film.

12. A package according to claim 8 wherein the sealed container contains only the bananas.

* * * * *